United States Patent [19]

Haskell

[11] Patent Number: 5,007,102

[45] Date of Patent: Apr. 9, 1991

[54] DATA COMPRESSION USING BLOCK LIST TRANSFORM

[75] Inventor: Barry G. Haskell, Tinton Falls, N.J.

[73] Assignee: AT&T Bell Laboratories, Murray Hill, N.J.

[21] Appl. No.: 351,334

[22] Filed: May 3, 1989

Related U.S. Application Data

[63] Continuation of Ser. No. 841,571, Mar. 20, 1986, abandoned.

[51] Int. Cl.⁵ ............................................. G06K 9/36
[52] U.S. Cl. ...................................... 382/56; 341/51; 358/133; 358/261.2
[58] Field of Search ............... 382/56, 27; 358/133, 358/135, 426, 261.2; 375/27; 341/51

[56] References Cited

U.S. PATENT DOCUMENTS

| | | | |
|---|---|---|---|
| 4,083,035 | 4/1978 | Riganati et al. | 382/27 |
| 4,215,375 | 7/1980 | Usubuchi et al. | 358/261.2 |
| 4,322,716 | 3/1982 | Steinberg | 382/27 |
| 4,363,036 | 12/1982 | Subramaniam | 358/261.2 |
| 4,425,582 | 1/1984 | Kadakia et al. | 382/41 |
| 4,460,923 | 7/1984 | Hirano et al. | 358/136 |
| 4,468,688 | 8/1984 | Gabriel et al. | 382/46 |
| 4,473,837 | 9/1984 | Tiemann | 358/133 |
| 4,506,382 | 3/1985 | Hada et al. | 382/27 |
| 4,517,596 | 5/1985 | Suzuki | 358/133 |
| 4,533,957 | 8/1985 | Iinuma | 358/135 |
| 4,541,012 | 9/1985 | Tescher | 358/135 |
| 4,562,468 | 12/1985 | Koga | 358/135 |
| 4,581,638 | 4/1986 | Chiariglione et al. | 358/135 |
| 4,656,500 | 4/1987 | Mori | 358/135 |

OTHER PUBLICATIONS

*IEEE Transactions on Communications*, "Image Compression Using Block Truncation Coding", vol. Com-27, No. 9, Sep. 1979, pp. 1335-1342, by E. J. Delp et al.

*Primary Examiner*—David K. Moore
*Assistant Examiner*—Joseph Mancoso
*Attorney, Agent, or Firm*—H. T. Brendzel

[57] ABSTRACT

A transform approach to image coding where pixels are coded in the order prescribed by a predetermined "List". The code for each pixel is developed by computing a prediction for the pixel based on the known pixel values in the neighborhood of the pixel and subtracting this prediction from the true value of the pixel. This results in a sequence of predominantly non-zero valued pixel prediction errors at the beginning of the encoding process (of each block), and predominantly zero valued pixel prediction errors towards the end of the encoding process. Enhancements to this approach include adaptive encoding, where pixel sequences having expected zero prediction errors are not encoded, and run length encoding of the signals to be transmitted or stored for augmenting the encoding process.

25 Claims, 9 Drawing Sheets

FIG. 1

IMAGE

BLOCK 10

FIG. 2

| 00 | 01 | 02 | 03 | 04 | 05 | 06 | 07 | 08 |
|----|----|----|----|----|----|----|----|----|
| 10 | 11 | 12 | 13 | 14 | 15 | 16 | 17 | 18 |
| 20 | 21 | 22 | 23 | 24 | 25 | 26 | 27 | 28 |
| 30 | 31 | 32 | 33 | 34 | 35 | 36 | 37 | 38 |
| 40 | 41 | 42 | 43 | 44 | 45 | 46 | 47 | 48 |
| 50 | 51 | 52 | 53 | 54 | 55 | 56 | 57 | 58 |
| 60 | 61 | 62 | 63 | 64 | 65 | 66 | 67 | 68 |
| 70 | 71 | 72 | 73 | 74 | 75 | 76 | 77 | 78 |
| 80 | 81 | 82 | 83 | 84 | 85 | 86 | 87 | 88 |

BLOCK 10

FIG. 3

| CODED PIXELS | PREDICTION PIXELS | | | | CODED PIXELS | PREDICTION PIXELS | | | |
|---|---|---|---|---|---|---|---|---|---|
| 88 | 08, | 08, | 80, | 80 | 81 | 71, | 71, | 82, | 80 |
| 84 | 88, | 88, | 80, | 80 | 83 | 73, | 73, | 84, | 82 |
| 48 | 88, | 88, | 08, | 08 | 85 | 75, | 75, | 86, | 84 |
| 44 | 84, | 84, | 04, | 04 | 87 | 77, | 77, | 88 | 86 |
| 66 | 88, | 84, | 44, | 48 | 12 | 22, | 11, | 02, | 13 |
| 62 | 84, | 80, | 40, | 44 | 14 | 24, | 13, | 04, | 15 |
| 22 | 44, | 40, | 00, | 04 | 16 | 26, | 15, | 06, | 17 |
| 26 | 48, | 44, | 04, | 08 | 18 | 28, | 28, | 08, | 08 |
| 82 | 62, | 62, | 80, | 84 | 32 | 42, | 31, | 22, | 33 |
| 86 | 66, | 66, | 88, | 84 | 34 | 44, | 33, | 24, | 35 |
| 24 | 44, | 44, | 04, | 04 | 36 | 46, | 35, | 26, | 37 |
| 28 | 48, | 48, | 08, | 08 | 38 | 48, | 48, | 28, | 28 |
| 68 | 88, | 88, | 48, | 48 | 52 | 62, | 51, | 42, | 53 |
| 64 | 84, | 84, | 44, | 44 | 54 | 64, | 53, | 44, | 55 |
| 42 | 62, | 62, | 22, | 22 | 56 | 66, | 55, | 46, | 57 |
| 46 | 66, | 66, | 26, | 26 | 58 | 68, | 68, | 48, | 48 |
| 33 | 44, | 42, | 22, | 24 | 72 | 82, | 71, | 62, | 73 |
| 35 | 46, | 44, | 24, | 26 | 74 | 84, | 73, | 64, | 75 |
| 37 | 48, | 46, | 26, | 28 | 76 | 86, | 75, | 66, | 77 |
| 73 | 84, | 82, | 62, | 64 | 78 | 88, | 88, | 68, | 68 |
| 75 | 86, | 84, | 64, | 66 | 21 | 31, | 20, | 11, | 22 |
| 77 | 88, | 86, | 66, | 68 | 23 | 33, | 22, | 13, | 24 |
| 51 | 40, | 42, | 60, | 62 | 25 | 35, | 24, | 15, | 26 |
| 53 | 42, | 44, | 62, | 64 | 27 | 37, | 26, | 17, | 28 |
| 55 | 44, | 46, | 64, | 66 | 41 | 51, | 40, | 31, | 42 |
| 57 | 46, | 48, | 66, | 68 | 43 | 53, | 42, | 33, | 44 |
| 31 | 30, | 30, | 22, | 42 | 45 | 55, | 44, | 35, | 46 |
| 71 | 70, | 70, | 82, | 62 | 47 | 57, | 46, | 37, | 48 |
| 11 | 01, | 01, | 20, | 22 | 61 | 71, | 60, | 51, | 62 |
| 13 | 03, | 03, | 22, | 24 | 63 | 73, | 62, | 53, | 64 |
| 15 | 05, | 05, | 24, | 26 | 65 | 75, | 64, | 55, | 66 |
| 17 | 07, | 07, | 26, | 28 | 67 | 77, | 66, | 57, | 68 |

FIG.4

| CLASS | CODED PIXELS | PREDICTION PIXELS | | | | CLASS | CODED PIXELS | PREDICTION PIXELS | | | |
|---|---|---|---|---|---|---|---|---|---|---|---|
| 1 | 88 | 08, | 08, | 80, | 80 | 6 | 81 | 71, | 71, | 82, | 80 |
| 2 | 84 | 88, | 88, | 80, | 80 | 6 | 83 | 73, | 73, | 84, | 82 |
| 2 | 48 | 88, | 88, | 08, | 08 | 6 | 85 | 75, | 75, | 86, | 84 |
| 2 | 44 | 84, | 84, | 04, | 04 | 6 | 87 | 77, | 77, | 88, | 86 |
| 3 | 66 | 88, | 84, | 44, | 48 | 6 | 12 | 22, | 11, | 02, | 13 |
| 3 | 62 | 84, | 80, | 40, | 44 | 6 | 14 | 24, | 13, | 04, | 15 |
| 3 | 22 | 44, | 40, | 00, | 04 | 6 | 16 | 26, | 15, | 06, | 17 |
| 3 | 26 | 48, | 44, | 04, | 08 | 6 | 18 | 28, | 28, | 08, | 08 |
| 4 | 82 | 62, | 62, | 80, | 84 | 6 | 32 | 42, | 31, | 22, | 33 |
| 4 | 86 | 66, | 66, | 88, | 84 | 6 | 34 | 44, | 33, | 24, | 35 |
| 4 | 24 | 44, | 44, | 04, | 04 | 6 | 36 | 46, | 35, | 26, | 37 |
| 4 | 28 | 48, | 48, | 08, | 08 | 6 | 38 | 48, | 48, | 28, | 28 |
| 4 | 68 | 88, | 88, | 48, | 48 | 6 | 52 | 62, | 51, | 42, | 53 |
| 4 | 64 | 84, | 84, | 44, | 44 | 6 | 54 | 64, | 53, | 44, | 55 |
| 4 | 42 | 62, | 62, | 22, | 22 | 6 | 56 | 66, | 55, | 46, | 57 |
| 4 | 46 | 66, | 66, | 26, | 26 | 6 | 58 | 68, | 68, | 48, | 48 |
| 5 | 33 | 44, | 42, | 22, | 24 | 6 | 72 | 82, | 71, | 62, | 73 |
| 5 | 35 | 46, | 44, | 24, | 26 | 6 | 74 | 84, | 73, | 64, | 75 |
| 5 | 37 | 48, | 46, | 26, | 28 | 6 | 76 | 86, | 75, | 66, | 77 |
| 5 | 73 | 84, | 82, | 62, | 64 | 6 | 78 | 88, | 88, | 68, | 68 |
| 5 | 75 | 86, | 84, | 64, | 66 | 6 | 21 | 31, | 20, | 11, | 22 |
| 5 | 77 | 88, | 86, | 66, | 68 | 6 | 23 | 33, | 22, | 13, | 24 |
| 5 | 51 | 40, | 42, | 60, | 62 | 6 | 25 | 35, | 24, | 15, | 26 |
| 5 | 53 | 42, | 44, | 62, | 64 | 6 | 27 | 37, | 26, | 17, | 28 |
| 5 | 55 | 44, | 46, | 64, | 66 | 6 | 41 | 51, | 40, | 31, | 42 |
| 5 | 57 | 46, | 48, | 66, | 68 | 6 | 43 | 53, | 42, | 33, | 44 |
| 5 | 31 | 30, | 30, | 22, | 42 | 6 | 45 | 55, | 44, | 35, | 46 |
| 5 | 71 | 70, | 70, | 82, | 62 | 6 | 47 | 57, | 46, | 37, | 48 |
| 5 | 11 | 01, | 01, | 20, | 22 | 6 | 61 | 71, | 60, | 51, | 62 |
| 5 | 13 | 03, | 03, | 22, | 24 | 6 | 63 | 73, | 62, | 53, | 64 |
| 5 | 15 | 05, | 05, | 24, | 26 | 6 | 65 | 75, | 64, | 55, | 66 |
| 5 | 17 | 07, | 07, | 26, | 28 | 6 | 67 | 77, | 66, | 57, | 68 |

FIG.5

| CLASS | INTERVAL | ROUNDING |
|---|---|---|
| 1 | 6 | 2 |
| 2 | 11 | 5 |
| 3 | 17 | 8 |
| 4 | 31 | 15 |
| 5 | 31 | 15 |
| 6 | 31 | 15 |

FIG.6

| CLASS | CODED PIXELS | PREDICTION PIXELS | | | | CLASS | CODED PIXELS | PREDICTION PIXELS | | | |
|---|---|---|---|---|---|---|---|---|---|---|---|
| 1 | 88 | 08, | 08, | 80, | 80 | 4 | 48 | 88, | 68, | 88, | 48 |
| 2 | 44 | 00, | 08, | 80, | 88 | 6 | 67 | 77, | 77, | 66, | 68 |
| 3 | 66 | 88, | 84, | 44, | 88 | 6 | 78 | 68, | 68, | 88, | 88 |
| 4 | 86 | 66, | 66, | 84, | 88 | 5 | 57 | 46, | 48, | 66, | 68 |
| 5 | 77 | 66, | 66, | 88, | 88 | 6 | 58 | 48, | 48, | 68, | 68 |
| 6 | 76 | 66, | 66, | 86, | 86 | 6 | 56, | 46, | 66, | 66, | 66 |
| 6 | 87 | 77, | 77, | 86, | 88 | | | | | | |
| 4 | 64 | 44, | 44, | 84, | 84 | 3 | 22 | 44, | 40, | 00, | 04 |
| 5 | 55 | 44, | 44, | 64, | 66 | 4 | 24 | 04, | 04, | 44, | 44 |
| 6 | 54 | 44, | 44, | 64, | 64 | 5 | 33 | 44, | 44, | 22, | 24 |
| 6 | 65 | 55, | 55, | 64, | 66 | 6 | 34 | 24, | 24, | 44, | 44 |
| 5 | 75 | 64, | 66, | 84, | 86 | 6 | 23 | 33, | 33, | 22, | 24 |
| 6 | 74 | 64, | 64, | 84, | 84 | 5 | 13 | 22, | 24, | 02, | 04 |
| 6 | 85 | 75, | 75, | 84, | 86 | 6 | 14 | 22, | 24, | 04, | 04 |
| 3 | 62 | 84, | 80, | 40, | 44 | 6 | 14 | 24, | 24, | 04, | 04 |
| 4 | 82 | 62, | 62, | 80, | 84 | 5 | 11 | 20, | 22, | 00, | 02 |
| 5 | 71 | 80, | 82, | 60, | 62 | 6 | 12 | 22, | 22, | 02, | 02 |
| 6 | 72 | 62, | 62, | 82, | 82 | 5 | 15 | 24, | 26, | 04, | 06 |
| 6 | 81 | 71, | 71, | 80, | 80 | 6 | 25 | 35, | 35, | 24, | 26 |
| 5 | 53 | 44, | 44, | 62, | 64 | 6 | 16 | 26, | 26, | 06, | 06 |
| 6 | 63 | 53, | 53, | 62, | 64 | | | | | | |
| 5 | 73 | 82, | 84, | 62, | 64 | 4 | 42 | 44, | 44, | 40, | 40 |
| 6 | 83 | 73, | 73, | 82, | 84 | 5 | 31 | 40, | 42, | 20, | 22 |
| 2 | 48 | 88, | 88, | 08, | 08 | 6 | 21 | 31, | 31, | 11, | 11 |
| 3 | 26 | 48, | 44, | 04, | 08 | 6 | 32 | 42, | 42, | 22, | 22 |
| 4 | 28 | 48, | 48, | 08, | 08 | 6 | 43 | 53, | 53, | 33, | 33 |
| 5 | 17 | 26, | 28, | 06, | 08 | 5 | 51 | 62, | 60, | 40, | 42 |
| 6 | 27 | 26, | 28, | 26, | 28 | 6 | 41 | 51, | 51, | 31, | 31 |
| 6 | 18 | 28, | 28, | 08, | 08 | 6 | 52 | 42, | 42, | 62, | 62 |
| 4 | 46 | 44, | 48, | 44, | 48 | 5 | 61 | 51, | 51, | 71, | 71 |
| 5 | 35 | 46, | 44, | .44, | 26 | | | | | | |
| 6 | 45 | 55, | 55, | 44, | 46 | | | | | | |
| 6 | 36 | 46, | 46, | 26, | 26 | | | | | | |
| 5 | 37 | 26, | 28, | 46, | 48 | | | | | | |
| 6 | 47 | 46, | 48, | 46, | 48 | | | | | | |
| 6 | 38 | 48, | 48, | 28, | 28 | | | | | | |

FIG. 7

| CLASS | CODED PIXELS | NEXT-PIX if-SKIP | NEXT-PIX | #SML PLS->0 | #LRG PLS->0 | CLASS | CODED PIXELS | NEXT-PIX if-SKIP | NEXT-PIX | #SML PLS->0 | #LRG PLS->0 |
|---|---|---|---|---|---|---|---|---|---|---|---|
| A | 88 | 44 | 84 | 0 | 0 | 5 | 36 | 37 | 37 | 1 | 1 |
| B | 44 | 84 | 48 | 1 | 1 | 4 | 37 | 68 | 68 | 1 | 1 |
| B | 84 | 48 | 48 | 2 | 0 | 5 | 47 | 68 | 68 | 1 | 1 |
| C | 66 | 62 | 48 | 2 | 0 | 5 | 38 | 68 | 68 | 1 | 1 |
| 3 | 86 | 64 | 62 | 1 | 1 | | | | | | |
| 4 | 77 | 64 | 62 | 4 | 2 | 3 | 68 | 22 | 22 | 1 | 2 |
| 5 | 76 | 64 | 64 | 1 | 2 | 5 | 67 | 57 | 57 | 1 | 2 |
| 5 | 87 | 64 | 64 | 1 | 1 | 5 | 78 | 57 | 57 | 1 | 1 |
| 3 | 64 | 62 | 48 | 1 | 2 | 4 | 57 | 22 | 22 | 1 | 2 |
| 4 | 55 | 75 | 62 | 4 | 2 | 5 | 58 | 22 | 22 | 1 | 2 |
| 5 | 54 | 75 | 75 | 1 | 1 | 5 | 56 | 22 | 22 | 1 | 1 |
| 5 | 65 | 75 | 75 | 1 | 1 | | | | | | |
| 4 | 75 | 62 | 62 | 1 | 1 | C | 22 | EB | EB | 1 | 0 |
| 5 | 74 | 62 | 62 | 1 | 1 | 3 | 24 | 42 | 42 | 4 | 1 |
| 5 | 85 | 62 | 62 | 1 | 1 | 4 | 33 | 13 | 13 | 1 | 2 |
| | | | | | | 5 | 34 | 13 | 13 | 1 | 2 |
| C | 62 | 48 | 48 | 2 | 1 | 5 | 23 | 11 | 42 | 1 | 1 |
| 3 | 84 | 48 | 48 | 1 | 2 | 4 | 13 | 11 | 11 | 1 | 2 |
| 4 | 71 | 53 | 48 | 2 | 2 | 5 | 14 | 15 | 42 | 1 | 1 |
| 5 | 72 | 53 | 53 | 1 | 1 | 4 | 11 | 15 | 15 | 1 | 1 |
| 5 | 81 | 53 | 53 | 1 | 1 | 5 | 12 | 42 | 42 | 1 | 2 |
| 4 | 53 | 73 | 48 | 1 | 1 | 4 | 15 | 42 | 42 | 1 | 2 |
| 5 | 63 | 48 | 48 | 1 | 1 | 5 | 25 | 42 | 42 | 1 | 1 |
| 4 | 73 | 48 | 48 | 1 | 1 | 5 | 16 | 42 | 42 | 1 | 1 |
| 5 | 83 | 48 | 48 | 1 | 1 | | | | | | |
| | | | | | | 3 | 12 | EB | EB | 1 | 2 |
| B | 48 | 22 | EB | 2 | 0 | 4 | 31 | 51 | 51 | 1 | 1 |
| C | 26 | 22 | EB | 2 | 0 | 5 | 21 | 51 | 51 | 1 | 1 |
| 3 | 28 | 46 | 68 | 1 | 2 | 5 | 32 | 51 | 51 | 1 | 1 |
| 4 | 17 | 46 | 68 | 1 | 1 | 4 | 43 | EB | EB | 1 | 1 |
| 5 | 27 | 46 | 46 | 1 | 2 | 5 | 51 | EB | EB | 1 | 1 |
| 5 | 18 | 46 | 46 | 1 | 1 | 3 | 41 | EB | EB | 1 | 1 |
| 3 | 46 | 68 | 22 | 1 | 1 | 4 | 52 | EB | EB | 1 | 1 |
| 4 | 35 | 37 | 68 | 2 | 1 | 5 | 61 | EB | EB | 1 | 1 |
| 5 | 45 | 37 | 37 | 1 | 1 | | | | | | |

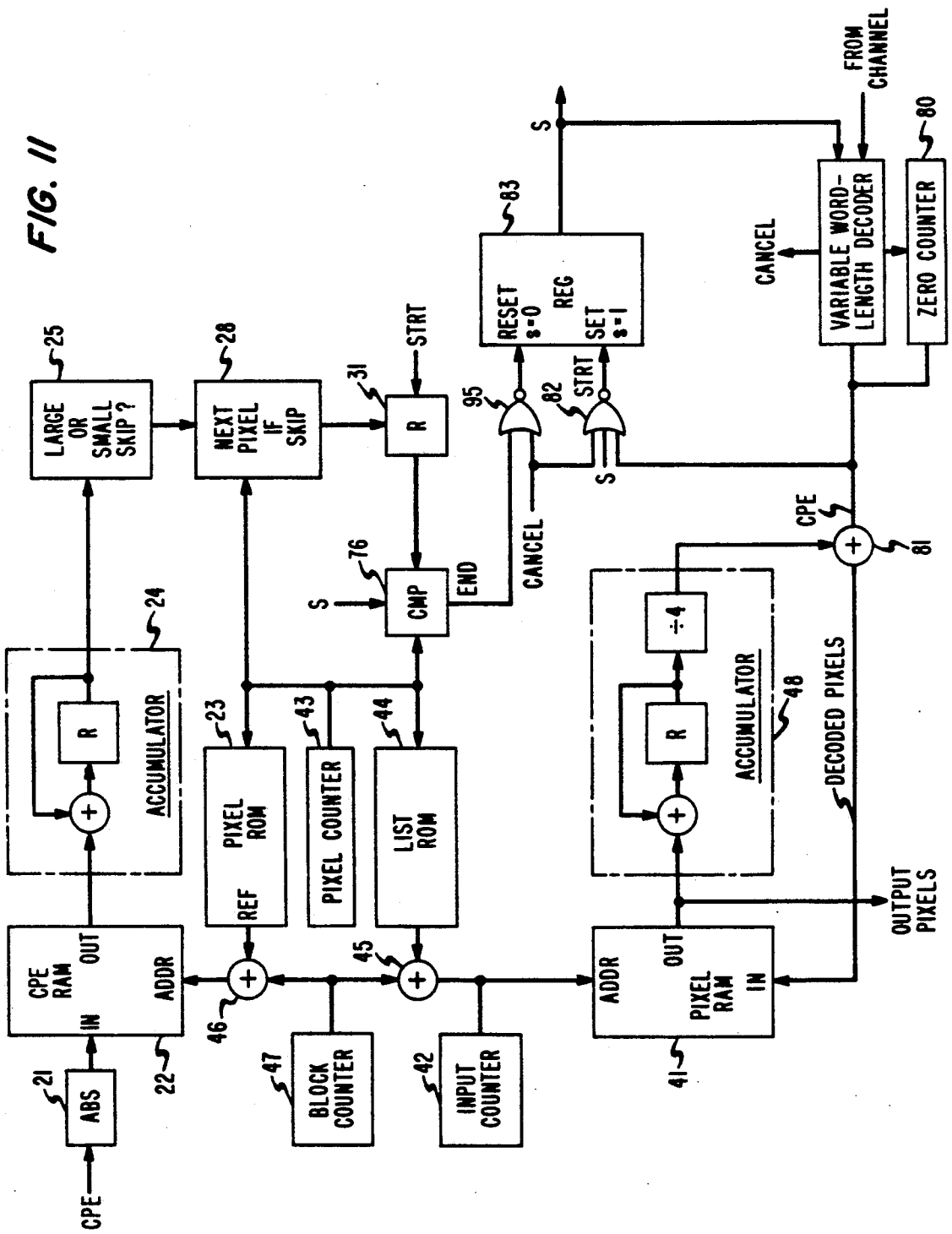

DATA COMPRESSION USING BLOCK LIST TRANSFORM

This application is a continuation of application Ser. No. 841,571, filed on Mar. 20, 1986, now abandoned.

BACKGROUND OF THE INVENTION

This relates to data processing and, more specifically, to a method and apparatus for encoding and decoding information in an efficient manner, both from the standpoint of the number of bits employed to describe the data and from the standpoint of the encoding process. Still more particularly, the method and apparatus of this invention relate to encoding and decoding of image information.

Image data compression has been a topic of considerable interest in recent years because of the burgeoning fields of information and communication. Although a picture is worth a thousand words, with unadorned techniques it may take more transmission capacity to handle a single picture than many thousands of words. Compared to text, the information content in an image is normally quite large and, therefore, the efficient transmission and/or storage of pictorial information has been subjected to extensive research for a number of years.

A number of factors have come into play that assist in that research. First, in many instances, the images stored or transmitted are static. No movement needs to be communicated, and that relaxes the storage and transmission requirements. Second, users find it acceptable for motion to have a limited temporal resolution. That too relaxes the storage requirements. Third, sometimes the information need not be handled on a real-time basis. Consequently, there is time to indulge in rather sophisticated processing techniques.

Another reason why image data compression is possible is that images contain a considerable amount of superfluous information. Generally, one can identify two kinds of superfluous information. Statistical redundancy, having to do with similarities in the data representing the image; and subjective redundancy, having to do with data similarities which can be removed without user complaints. Statistical redundancy is illustrated by the transmission of a white page which may be depicted without repeatedly specifying (at every pixel) the color of the page. Subjective redundancy is illustrated by the fact that in depicting movement one can ignore events that occur faster than a certain speed, because the human eye cannot discern those events.

Researchers have tried to encode images in a number of ways that realize transmission and storage savings by eliminating the aforementioned redundancies. These encoding approaches can be broadly divided into predictive Pulse Code Modulation, Interpolative or Extrapolative Coding, Transform Coding, and Vector Quantization.

In predictive coding, such as in the Differential Pulse Code Modulation (DPCM) approach, an attempt is made to predict the pixel to be encoded. The prediction is made by using the encoded values of the previously encoded pixels. Generally, these pixels are combined to generate a predicted value; and the signal that is quantized, encoded and transmitted is the difference between the actual value and the generated predicted value. Adaptive DPCM, where the prediction algorithm is based on local picture statistics, is a variation on this approach.

In interpolative coding, only a subset of the extrapolative coding, only a subset of the pixels is sent to the receiver. The receiver must then interpolate the available information to develop the missing pixels.

In transform coding, instead of coding the image as discrete intensity values on sets of sampling points, an alternative representation is made first by transforming blocks of pixels into a set of coefficients. It is the coefficients that are quantized and transmitted. Several transformations have been used in the art, such as the Hadamard, the Karhunen-Loeve, and the Discrete Cosine Transforms. These transforms, being unitary, conserve the signal energy in the transform domain but, typically, most of the energy is concentrated in relatively few samples. Predominately, it is the samples representing the low frequencies that are non-zero. Samples that are zero, or ones that are very close to zero, need not be transmitted. Still additional samples of low value can be quantized coarsely, resulting in substantial compression of the data that needs to be either stored or transmitted.

Yet another encoding technique is Vector Quantization, where an image block is decomposed into a set of vectors. From the possible (or experienced) signal patterns and corresponding vectors, a subset of representative vectors is selected and included in a code book. When encoding, the developed sets of vectors are replaced with the closest representative vectors in the code book, and compression is achieved by further replacing the representative vectors with labels. At the receiver, the inverse operation takes place with a table look-up which recovers the representative vectors. A facsimile of the image is reconstructed from the recovered representative vectors.

The decoding process in vector quantization is quite simple, but that is not the case on the encoding side. Primarily this is because one must develop the code book, and that becomes impractical when the image block is large or when good fidelity is desired. Also, to develop those representative vectors one must use a "training" set of data.

It is an object of this invention, therefore, to provide an image compression approach that is both efficient and easy to implement.

SUMMARY OF THE INVENTION

These and other objects of the invention are realized with a Block List Transform (BLT) approach to image coding. As with the the Block Transform Coding and the Vector Quantization approaches, the BLT encodes two dimensional blocks of pixels. Furthermore, it uses predictive coding to represent the pixels of each block which is processed. The encoding process is different, however, because the pixels are not treated in the normal order of left-to-right, top-to-bottom. Instead, they are coded in the order prescribed by a predetermined "List". The code for each pixel is developed by computing a prediction based on the previously coded pixel values in the neighborhood of the pixel being coded and subtracting this prediction from the true value of the present pixel. This results in a sequence of predominantly non-zero valued pixel prediction errors at the beginning of the encoding process (of each block), and predominantly zero valued pixel prediction errors towards the end of the encoding process. Enhancements to this approach include adaptive encoding, where pixel sequences having expected zero prediction errors are not encoded, and run length encoding of the signals to be transmitted/stored for augmenting the encoding process.

BRIEF DESCRIPTION OF THE DRAWING

FIG. 1 depicts a square image and a plurality of blocks dividing the image;

FIG. 2 shows one of the blocks of FIG. 1 in detail and identifies the pixel coordinates within the block;

FIG. 3 is a table specifying the prediction pixels employed in developing a predicted value for each of the pixels in FIG. 2;

FIG. 4 identifies the quantization groupings in the table of FIG. 3;

FIG. 5 is a table identifying the quantization interval and rounding values for the groupings of FIG. 4;

FIG. 6 is a table that presents the pixels of FIG. 2 in an order, as close as possible, according to geometrical proximity of the pixels;

FIG. 7 is a table that introduces the prediction orders and thresholds used in an adaptive encoding method following the principles of this invention;

FIG. 11 is a block diagram illustrating a decoder embodiment adapted to decode the signals developed by the FIG. 10 encoder.

DETAILED DESCRIPTION

Figure 8:
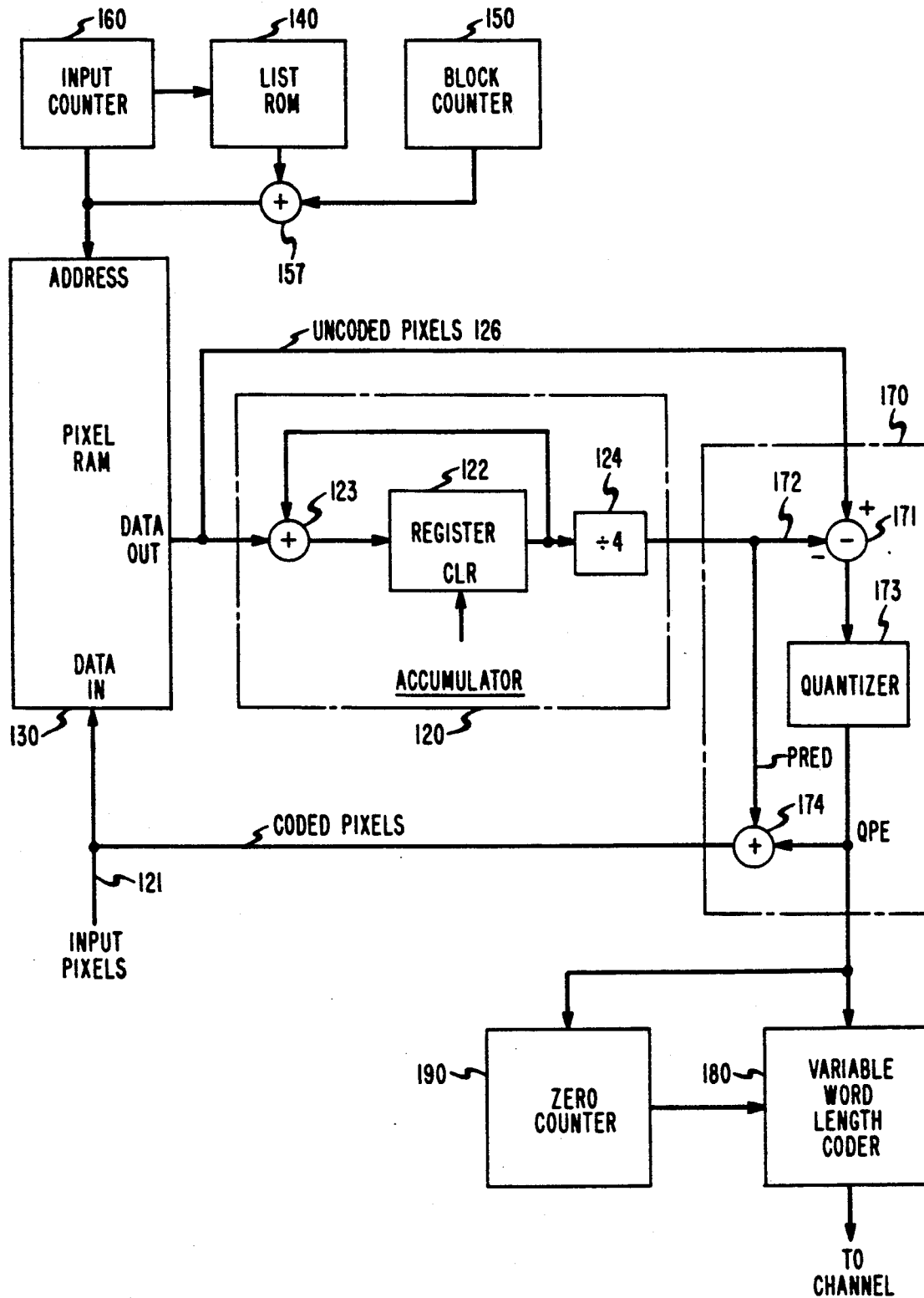
FIG. 8 is a block diagram describing one embodiment of an encoder embodying the principles of this invention.

An image to be encoded may be divided into overlapping blocks, or non-overlapping blocks as shown in FIG. 1. Typically the blocks are small enough so that there is reasonable correlation between the pixels in the block. FIG. 2 shows an 8×8 block of pixels, such as block 10 in FIG. 1, along with some pixels from previously coded blocks above and to the left of block 10. The first pixel subscript is the row number, and the second is the column number. The pixels to be coded are in rows 1–8, columns 1–8, while row 0 and column 0 are from previously transmitted blocks, and need not be coded. FIG. 2 can also be viewed as an overlapping block, having one overlapping row and one overlapping column.

FIG. 3 is a table which shows one complete list of the pixels in block 10. The list of FIG. 3 specifies the order of coding of the pixels in the block of FIG. 2 and the pixels used in developing the predicted value of each pixel. It should be understood, of course, that the list of FIG. 3 is merely illustrative and that many other lists can be created which achieve essentially the same encoding results. Also included in the table of FIG. 3 are the previously transmitted pixels which are to be used in the prediction of the corresponding pixel to be coded.

The method of my invention proceeds as follows. The first pixel to be encoded and sent is the lower right hand pixel 88 (in FIG. 2), for which a prediction is formed from pixels 08 and 80. It may be highlighted that pixels 08 and 80 have values that have been previously developed in the course of the encoding process of previous blocks. The difference between the actual value of pixel 88 and its prediction is quantized, coded and transmitted. This is the quantized differential prediction error. A coded value for pixel 88 is then formed by adding the prediction to the quantized differential error. This is also the value which is reconstructed at the receiver. In accordance with the instant invention, the coded value of pixel 88 is substituted in block 10 for the original value of the pixel. Next, a prediction for pixel 84 is developed using pixels 80 and 88 and the difference between the prediction value and the actual value is encoded and sent. Pixel 84 is then replaced in block 10 by its coded value. This procedure continues until all remaining pixels in the list have a zero quantized differential prediction error. At that time, an End-Of-Block (EOB) message is sent, and the coder moves onto the next block of pixels to be coded.

Actually, in some realizations it is advantageous (as will become more apparent infra) to use a small buffer where a few values are saved prior to transmission. Also, a zero counter keeps track of strings of zero values. Zero values are not sent right away and may not be sent at all, if they occur immediately before an EOB.

It may be observed that as the algorithm progresses further down the list, the prediction pixels become spatially closer and closer to the pixel to be coded. This leads to a prediction error that, on average, becomes smaller and smaller toward the end of the list.

It may also be noted that, as in Block Transform Coding, in BLT coding the last few non-zero data are often preceded by many zero values. Encoding and sending all those zero values in order to read the few non-zero data points can cause an unnecessarily high bit rate. Therefore, if the last few nonzero values (stored in the aforementioned small buffer) are small, they can usually be truncated to zero without seriously affecting coded image quality, and the overall bit rate is then reduced.

Another property for which the BLT can be used to good advantage is that quantization of the prediction error can become coarser and coarser as the encoding process continues down the list. This occurs for two reasons. First, nonzero BLT data towards the end of the list are caused by edges or texture in the picture; and in these regions it is well known that quantization noise is less visible than in flat, low detail areas of the image. Secondly, for pixels further down the list, only large magnitude intensity transitions are able to cause sizable BLT data, because the neighboring points are, presumably, close to the actual average of the image. Therefore, large quantization errors will not be as visible for these pixels. Thirdly, the feedback quantization of the BLT results in the quantization noise being fairly localized and of high frequency. This further contributes to a lessening of visibility. This, by the way, is in contrast to Block Transform Coding approaches (e.g., Cosine Transform) in which quantization of one coefficient affects all pixels in the block.

Taking advantage of the above-described inherent advantages of the BLT approach, an enhanced algorithm allows for different quantization levels in different groups of pixels. FIG. 4 shows the pixels of FIG. 3 grouped into six classes {1,2,3,4,5,6} for the purpose of defining quantizations. Pixels in the lower classes have their prediction errors quantized finer than those of the upper classes. FIG. 5 shows one possible allocation for uniform quantization. The quantization can be carried out by simply adding the rounding value to the magnitude of the prediction error, dividing by the quantization interval size and multiplying by the sign of the prediction error. This yields a signed integer. Reconstruction is accomplished through multiplication by the interval size.

When encoding certain classes of images, it turns out that clusters of nonzero data points occur along edges of objects and in textured regions. This clustering of BLT data points suggests that savings may be possible if the pixels are sent not in a fixed order, but instead are sent according to a criterion of whether or not nearby data points are zero. The first step in implementing such an adaptive procedure is to reorder the prediction table of FIG. 4 so that pixels which are geometrically close to each other in the block are also close to each other in the table. One possibility of such reordering is shown in the prediction table of FIG. 6. It may be noted that the FIG. 4 quantization classes are retained, and that in some cases the pixels used to develop the prediction values had to be altered in order to utilize only previously coded pixels. This is necessary because the receiver has available only the previously encoded pixels.

The next step is to devise a criterion for determining when there are no more significant data points to be sent in the small region currently being coded. An example of such a procedure is shown in the table of FIG. 7.

The first two columns of the FIG. 7 table are the same as in the prediction table of FIG. 6. The next two columns are entitled "Next Pixel if Skip" and specify which coded pixel to skip to if it is determined that coded pixels can be skipped. If a "Small Skip" is to be attempted, the first pixel entry is used. If a "Large Skip" is to be attempted, the second pixel entry is used.

In general, whenever a zero quantized prediction error is transmitted, a skip of pixels is attempted. Whether or not to attempt a large or a small skip is determined by the previously coded reference pixels. If the coded prediction errors for these reference pixels are sufficiently small then a large skip is attempted. Otherwise, a small skip is attempted. If there are no reference pixels, then only a small skip is attempted.

It may be in certain circumstances that not all skips are in the best interests of maintaining good coded picture quality. For example, in some image blocks pixels 44, 40 and 80 may well have zero quantized prediction error, which would normally imply a large skip from pixel 44 to coded pixel 48. However, in some other image blocks there may be large nonzero quantized prediction errors at some of the intervening coded pixels in the list. For this reason a "Cancel Skip (CS)" message capability is included which may be transmitted by the coder. The occurrence of this message means that the skip attempt which would normally be made because of zero differential values is to be ignored at the coder and the decoder. Decoding then simply resumes with the next pixel, as if the previous pixel has a nonzero differential value. The cancel skip code rarely needs to be sent, however, with well designed Block Lists.

Columns 5–8 of the skip criterion table determine whether or not a CS message is to be transmitted. If a large skip is being attempted, columns 4, 6 and 8 are used; otherwise, columns 3, 5 and 7 are used. The way these parameters are used is as follows. Following the decision to attempt a skip, the coder begins calculating quantized differential values for succeeding pixels up to, but not including, the pixel specified in column 3 or 4, whichever is being used. During this process the nonzero quantized values are counted in accordance with their value. When the absolute value of the quantized differential values is small, e.g., equal to the quantization interval itself, then a "small pixel" counter is incremented. If the nonzero value is large, a "large pixel" counter is incremented. For each pixel examined before a possible CS, a zero differential value is coded for that pixel even if the actual quantized differential value is nonzero and one of the counters is incremented. If during the skip attempt, the number in the small pixel counter exceeds the value in column 5 or 6, whichever is being used, or the number in the large pixel counter exceeds the value in column 7 or 8, whichever is being used, then a CS message is sent followed by a zero value for each pixel examined so far in the attempted skip. Coding of pixels then resumes in the normal manner. It may be noted that the letter "I" in the table of FIG. 7 indicates "infinity", which represents an arbitrary large number; and EB stands for End of Block.

By the above-described adaptive means, small areas of zero differential values within a block can be coded without requiring any information to be sent to the receiver. The decoder assumes simply that in the absence of a CS message, skipped pixels have zero differential value and can be replaced by their prediction values in the reproduced image.

If skipped pixels occur at the end of the ordered list of coded pixels, then the End-of-Block message can also be deleted from the transmission, as long as the first pixel value in the following block is forcibly transmitted independently of whether it has a zero value. However, it only pays to delete the end-of-block message if less than a certain number of zero values exist. If a long string of zero pixels must otherwise be sent at the end of a block, then sending the end-of-block message takes fewer bits.

As simple as the encoding approach is, the decoding approach is even simpler. To decode an image block with the aid of received signals one must only consult the column and row of two previous blocks, as in FIG. 2, (which is effect seed the process) and the Block List used in the encoding process. A prediction signal is developed based on the prediction pixels specified in the list, and the prediction signal is augmented by the quantized prediction error received from the encoder. The augmented signal is stored in the block and the decoding process continues with the next pixel in the list.

FIG. 8 shows one possible implementation of the basic coding operation called for by the instant invention. For a simple arithmetic averaging predictor, all that is required is an accumulator 120, a pixel-RAM 130, a ROM 140 for the controlling list, counters 150 and 160, and a coder 170.

Although the method of my invention deals with blocks, such as the 8×8 block of FIG. 2, one must realize that in many applications one is presented with entire scan lines at a time. Before accepting the first pixel in the 8th scan line, therefore, one must dispose of (or store) the lines of the previous seven scans. Eight scan lines comprise a strip of pixel blocks and, accordingly, the first step is to load an entire strip of pixel blocks (appearing on line 121), into the pixel-RAM. RAM addresses for this operation are provided by input counter 160. The bottom-most row (8) of pixels from the previously transmitted strip of pixel blocks is kept in the pixel-RAM and becomes the top-most row (0) of the present strip of pixel blocks. The leftmost column (0) of the leftmost block is filled with some suitable predetermined value, e.g., the value of pixel 01, or in the case of color difference blocks, simply zero.

Coding commences next. Block counter 150 outputs the address of pixel 00 for the block presently being coded and all other addresses are referenced to it with the aid of adder 157. Accumulator 120 contains a register 122 and that register is cleared. Thereafter, list-ROM 140 outputs, for example four addresses corresponding to the four pixels which are employed to develop the prediction value. List ROM 140 contains the entire list of the block, e.g., the list of FIG. 3. These are added by the accumulator (adder 123), and the sum is divided by four (divider 124) to obtain the coded pixel value. Thence, list-ROM 140 outputs the address of the pixel to be coded, the encoded pixel is passed to subtracter 171 along lead 126 where it meets the predicted value on lead 172. A differential error is computed in subtracter 171 and passed on to quantizer 173. Quantizer 173 develops the quantized prediction error (QPE) whose value is added to the prediction value in adder 174 to obtain the coded pixel value. The coded pixel is then written into the pixel-RAM to replace the uncoded pixel value. This coded pixel value is later be used in the predictions of other pixels in the same block, or for pixels in blocks to the right and below in the image. Succeeding pixels of the block are coded similarly, under control of counter 160 which provides addresses to list-ROM 140 and pixel-RAM 130.

The quantized prediction error values may be coded in any one of several ways prior to transmission or storage; most of which are fairly well known. For example, FIG. 8 shows a variable word-length coder 180 for the non-zero values, in parallel with a zero counter 190 which is used to implement run-length coding of zero values. If the end-of-block arrives after a string of zero values (as it usually will), then the final run-length of zeros is not sent. Instead, an end-of-block message is transmitted.

Figure 9:
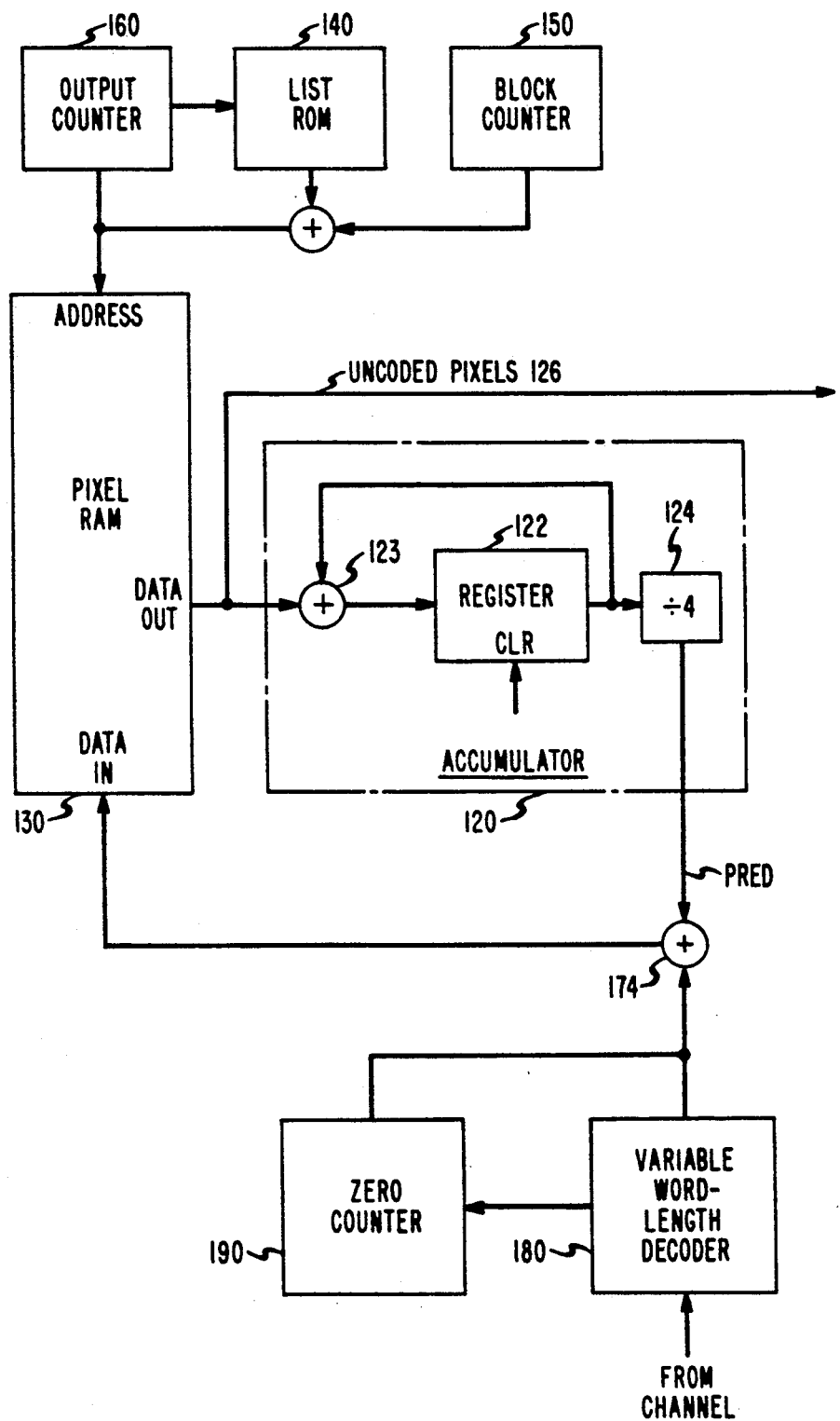
FIG. 9 is a block diagram illustrating a decoder embodiment adapted to decode the signals developed by the FIG. 8 encoder.

The decoder for the basic BLT is shown in FIG. 9 and it is essentially the inverse of the encoder. The variable word-length decoder (180) produces either nonzero prediction error values or zero-run lengths, depending on what was transmitted. In the case of zero-run lengths, the zero counter is used to produce a string of zero quantized prediction error (QPE) values to be added (in adder 174) to the corresponding prediction values (from accumulator 120) in order to reproduce the coded pixels. Upon reception of an end-of-block signal, the zero counter is used to produce zero QPE values for the remaining pixels of the block. After decoding all blocks of a strip, the data is output from pixel-RAM 130 via lead 126, with the pixel-RAM addresses being provided by output Counter 160. List-ROM 140 and counters 150 and 160 operate in a manner that corresponds to their operation in the FIG. 8 encoder.

Figure 10:
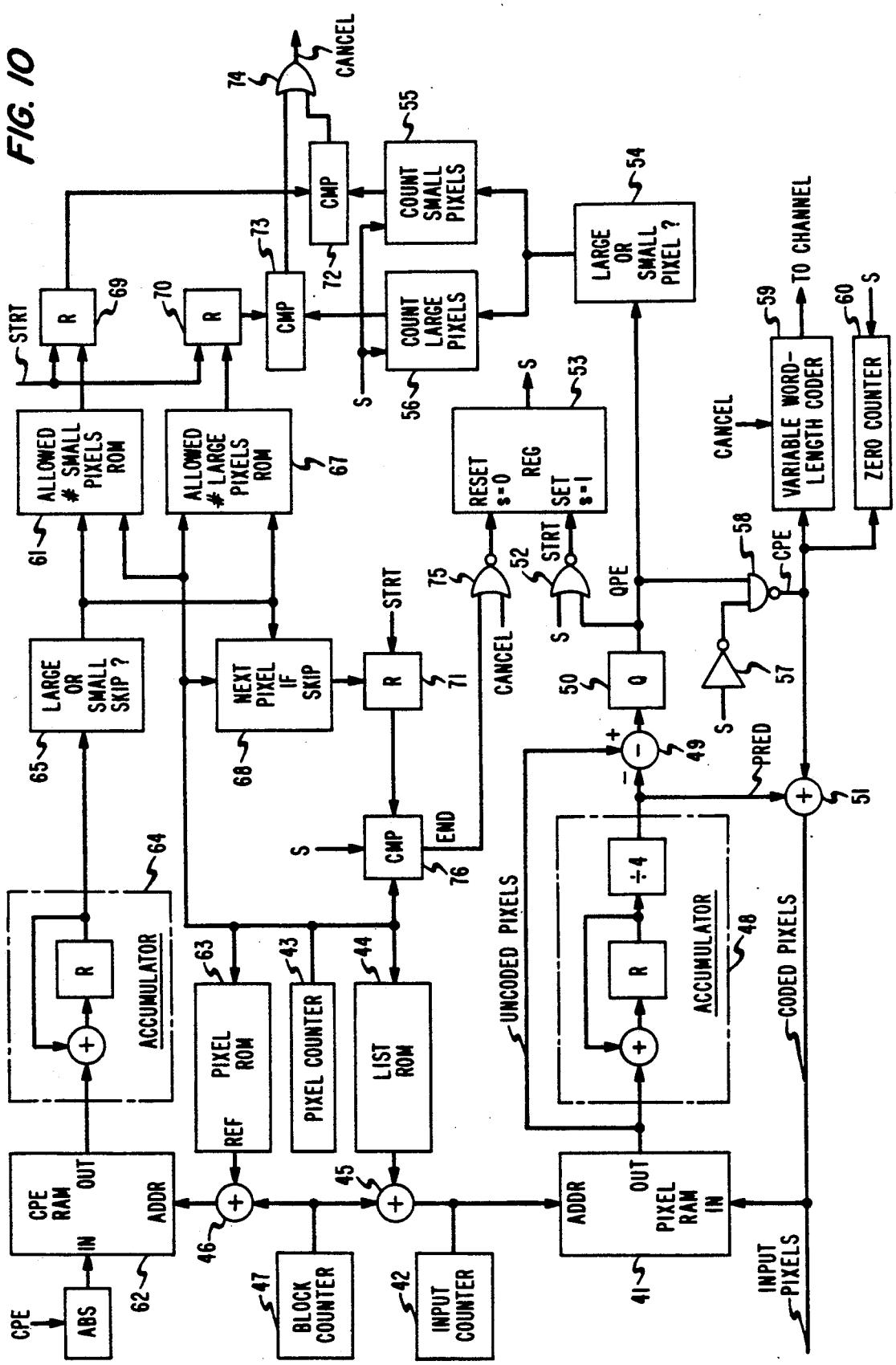
FIG. 10 is a block diagram illustrating an encoder embodiment employing adaptive encoding in accordance with the principles of this invention.

One implementation for an adaptive BLT encoder is shown in FIG. 10. First, all registers are reset to zero (e.g., within accumulators 48 and 64 and elements 69, 70, 71), and image data enters pixel-RAM 41 in the same way as in FIG. 8, with addresses being provided by input counter 42. Coding then commences as in FIG. 8. Pixel addresses within a block are provided by counter 43 and list-ROM 44, and fed to adder 45. The beginning address of each block is output by block-counter 47 and fed to adders 45 and 46. The output of adder 45 then provides the pixel addresses necessary for prediction and coding. Every set of four prediction pixel addresses is followed by one coded pixel address.

Coding commences as in FIG. 8 using accumulator-divide-by-4 circuit 48, subtracter 49, quantizer 50, adder 51, and variable word-length coder 59 together with zero counter 30. The output of quantizer 50 is the Quantized Prediction Error (QPE).

Adaptive BLT coding begins as soon as a zero value for QPE is transmitted by the coder 59. A QPE=0 causes a STRT signal to appear at the output of NOR gate 52, which in turn causes register 53 to be set to 1. The output of Register 53 is the skip attempt indicator (S), which enables certain operations described below. The S signal is fed back to NOR gate 52 in order to disable further STRT signals during this skip attempt. Small/Large indicator 54 checks the magnitude of each nonzero QPE and passes the result to counters 55 and 56. If S=1, indicating that a skip attempt is in progress, then small counter 55 counts the number of "small" nonzero QPEs, while large counter 56 counts the number of "large" nonzero QPEs. Whenever S=0, counters 55 and 56 are reset to zero.

During a skip attempt, S=1 also causes the Coded Prediction Error (CPE) to be forced to zero by means of inverter 57 and AND gate 58. Zero CPEs generated during a skip attempt are counted by zero counter 60 for possible later transmission. Whenever S=0, counter 60 is reset to zero.

Coded Prediction Error (CPE) values are added to the prediction values by adder 51, and the resulting coded pixel values are inserted into pixel-RAM 41 with addresses being provided by adder 45, in the same way as in FIG. 8. However, with adaptive BLT the magnitude of the CPE values (which are provided by gate 58 and modified by ABS circuit 61) are inserted into the prediction-error-RAM 62. Addresses are provided by reference-pixel-ROM 63 and adder 46 in exactly the same way as with list-ROM 44 and adder 45, except that here four reference pixel addresses appear at the output of adder 46 instead of four prediction pixel addresses.

While accumulator 48 is calculating a prediction value, accumulator 64 is summing the magnitudes of the corresponding reference pixel CPEs. After this is done, circuit 65 examines the resulting value to determine if a large skip or a small skip should be attempted, and passes the answer to ROMs 66, 67 and 68. Memories 66, 67, and 68 contain the information of columns 3–8 in FIG. 7. At the start of a skip attempt, as indicated by the STRT output of NOR gate 52, the outputs of ROMs 66, 67 and 68 are stored in registers 69, 70 and 71, respectively, for use as follows.

Register 69 outputs the number of small nonzero QPEs allowed before a premature cancellation of the skip attempt, and similarly register 70 outputs the number of allowed large nonzero QPEs. Register 71 outputs the next pixel to be encoded if the skip attempt is successful.

The output of counter 55, which is the number of small nonzero QPEs encountered so far, is compared with the maximum allowed (in register 69) by comparator 72. If the number is too large then comparator 72 causes a CANCEL signal to appear at the output of OR gate 74. Similarly, the number of large nonzero QPEs (in counter 56) is compared with the maximum allowed (in Register 70) by comparator 73, and if it is too large the CANCEL signal is generated.

The CANCEL signal is fed to variable word-length coder 59, whereupon it causes a cancel-skip word to be sent to the channel. Following this, the zero run-length output of zero counter 60 is sent, and counter 60 is reset to zero. The CANCEL signal is also fed to OR gate 75, which generates a STOP signal which, in turn, causes the skip indicator output (S) of register 53 to be reset to zero, thus prematurely ending the skip attempt.

During a skip attempt, S=1 enables comparator 76, which compares the output of pixel-counter 43 with the next-pixel-if-skip value in register 71. When they become equal the skip attempt is successful, and the END signal is generated. The END signal is fed to OR gate 75 which resets register 53 to S=0. Coding then recommences in the normal way.

An implementation of an adaptive BLT Decoder is shown in FIG. 11, where most of the modules perform exactly the same function as their counterparts in FIG. 10. In normal operation, variable word-length decoder 89 receives CPE values and passes them to adder 81 for construction of the decoded pixels. However, if a CANCEL message is received, then immediately following may be a zero run-length value. Decoder 89 then outputs the CANCEL signal during the entire time that zero counter 80 is producing zero CPE values corresponding to the received zero run-length value. The CANCEL signal of decoder 89 is fed to both OR gate 95 and to NOR gate 82 in order to prevent a skip, as described below. Following this, normal operation resumes.

If a zero CPE value is received which is not immediately followed by a CANCEL signal, then a skip can be made, and a STRT signal is generated at the output of NOR gate 82. Skip indicator register 83 is then set to S=1, which disables further operation by decoder 89. Pixels are then decoded using zero CPE values until the END signal is generated by comparator 76, which causes register 83 to be reset to S=0. Following this, normal operation again resumes.

Upon reception of an End-of-Block signal, decoder 89 simply outputs a very large zero run-length number to zero-counter 80. This causes zero CPE values to be generated until the end of the block, at which time pixel-counter 43 generates a Start-of-Block signal resetting the system. Frequently, it is not necessary to send and End-of-Block signal, since in many cases the transmission of a few zero CPE values causes automatic skips to the end of the block.

The above-described method and implementation are illustrative of the principles of my invention and variations are, of course, possible which are within the scope of my invention. For example, what has been described is an approach where there is effectively a one row and one column overlap between adjacent blocks. It should be realized that any desired overlap is possible in accordance with my invention. The obvious tradeoff is that with greater overlap the prediction accuracy improves, but each new block either encodes fewer pixels or is larger.

Another enhancement may be to use a number of pixels other than four in developing the predicted value of a pixel, or of using other than a simple arithmetic average, e.g., median. Again, there is a tradeoff between accuracy and processing effort.

Yet another variation relates to the block list. In some applications (e.g., where the block is very large) it may be easier to develop the block list "on the fly" rather than rely on a large table. Instead of a list-ROM element one would have a processing element that would develop the required sets of prediction pixels.

Still another enhancement relates to the order in which the blocks of FIG. 1 are processed. In facsimile transmission where sequential scanning is the norm (e.g., from top to bottom and from left to right), blocks would most conveniently be encoded in a similar sequence. This is the approach employed in the above illustrative embodiments, with a pixel-RAM storing strips of data. If the pixel-RAM is large enough, however, the entire image may be stored first and the order of encoding can then be different. One could, for example, start with the block in the center of the image and work outwards, or vice versa.

Although the description above relates to encoding and decoding of image information, as has been indicated initially invention relates to the field of data compression generally. The aforesaid pixels are mere illustrative examples of data points, or values, and the method and apparatus described herein in connection with an image compression environment is equally applicable to other data compression tasks, such as compression of speech signals.

What is claimed is:

1. A method for predictively encoding scanned data signals divided into two-dimensional blocks containing a plurality of data point signals, comprising the steps of:
    selecting a data point signal to be encoded in a sequence predetermined by a given ordered list where some adjacent data points in said list are from different, non-adjacent, lines of a block;
    obtaining a set of prediction data point signals for the selected data point from among encoded data point signals and forming a neighborhood that is substantially centered in the two dimensions about the corresponding data point signals to be encoded;
    developing a predicted value for said selected data point signal in accordance with said set of prediction data point signals;
    developing a quantized prediction error signal from a quantized arithmetic difference between said data point signal to be encoded and said predicted value; and
    developing an encoded data point signal based on said predicted value of said selected data point signal and on said quantized prediction error signal, to add thereby to said encoded data point signals.

2. The method of claim 1 further comprising
    a step of initially storing the data point signals of a block to be encoded in a storage element; and
    said step of developing an encoded data point signal comprises a step of replacing in said storage element each selected data point signal with its corresponding encoded data point signal.

3. The method of claim 2 wherein said step of developing a predicted value combines said prediction point signals obtained by said step of obtaining a set of prediction data point signals.

4. The method of claim 1 further comprising the step of encoding said quantized prediction error signal in accordance with a preselected variable word length encoding method.

5. The method of claim 1 wherein said steps of selecting a data point signal to be encoded, obtaining a set of prediction data point signals, developing a predicted value, and developing quantized prediction error signal are iterated for each data point signal in each of said blocks.

6. The method of claim 5 wherein said step of selecting a data point signal to be encoded from said list adaptively progresses through said list in order, or skips over preselected data point signals based on specific characteristics of said data.

7. The method of claim 5 wherein said list is an ordered list and said step of selecting a data point signal from said list selects data point signals in order when said quantized prediction errors are large, and selects data point signals out of order when said quantized prediction errors are small.

8. The method of claim 1 wherein at least one of said blocks includes a data signal overlap with other blocks.

9. The method of claim 8 wherein said data overlap appears along one horizontal edge and one vertical edge of each of the blocks that include a data signal overlap.

10. A method for encoding data signals divided into blocks, where each block contains a plurality of data point signals, comprising the steps of:
    employing a list that identifies each data point in a block and, for each identified data point, the list identifies a set of prediction data points with at least one of said sets of prediction data points forming the corners of a two-dimensional polygon, where the identified data point corresponding to each such set is within the polygon; and
    encoding each block of said data signals with a step of selecting a data point signal from said block in accordance with said list, a step of selecting a set of prediction data point signals from said block in accordance with said list and corresponding to said selected data point, a step of developing a predicted value for said selected data point signal from previously encoded data point signals specified by said corresponding prediction data points in said list, and a step of developing a quantized prediction error signal from a quantized arithmetic difference between said selected data point signal and said predicted value.

11. The method of claim 10 further comprising a step of variable word length encoding and zero run length encoding of said quantized prediction error signals.

12. A method for encoding two-dimensional data containing a plurality of data point signals, comprising the steps of:
    segmenting said data into adjacent two-dimensional blocks of data point signals;
    ordering said blocks, and
    encoding said blocks in accordance with said ordering and in accordance with a preselected encoding order list of data points within each of said blocks;
    where said list includes a collection of entries, each entry designating a data point within a block to be predictively encoded and a prediction list containing a plurality of previously predictively encoded prediction data points in the neighborhood of said data point, where the locus of points of said prediction data points forms a curve other than a straight line and the corresponding data point is within a two-dimensional polygon outlined by said locus of points; and
    where said encoding of a block includes
        a step of proceeding in order through said collection of entries of said list to select a next entry of said collection,
        a step of selecting a data point signal from said block in accordance with said selected next entry,
        a step of selecting prediction data point signals from said block in accordance with said prediction list corresponding to said selected next entry,
        a step of developing a predicted value for said selected data point signal based on said corresponding prediction data point signals, and
        a step of developing a quantized prediction error signal from a quantized arithmetic difference between said selected data point signal and said predicted value.

13. The method of claim 12 wherein said order of said blocks conforms to a scanning order of said data.

14. The method of claim 12 wherein said order of said blocks is from left to right and top to bottom.

15. A method for decoding two-dimensional blocks of data signals from received quantized prediction error signals comprising the steps of:
    selecting a data point signal to be decoded;
    obtaining a set of prediction data point signals preassigned to said data point signal to be decoded from an ordered list that specifies candidate data point signals and, with each candidate data point signals, specifies a unique preassigned set of prediction data points that define a two-dimensional neighborhood essentially centered above the associated data point where all of the prediction data points associated with a candidate data point signal are themselves candidate data point signals earlier in said list;
    developing a prediction value based on previously decoded data point signals, as specified by said set of prediction data point signals; and
    combining said prediction value with available received quantized prediction error signal associated with said data point signal to be decoded to develop a decoded value.

16. A block list encoder for encoding data point signals comprising:
    a data point memory for storing input data point signals belonging to data blocks;
    a block list memory for storing a list of candidate data points in a block and storing for each candidate data point a corresponding set of prediction data point designations where each of the designated prediction data points of a candidate data point is also a candidate data point earlier in said list;
    an address counter;
    means for addressing said data point memory with said address counter and said block list memory;
    a predictor responsive to output signals of said data point memory computation means responsive to output signals of said data point memory and to said predictor output signals for developing quantized prediction error signals;
    combining means responsive to said computation means and to said predictor for developing coded values;
    means for storing said coded values in said data point memory; and
    output means responsive to said computation means for delivering said quantized prediction error signals.

17. The encoder of claim 16, wherein said output means comprises an encoder for compressing said quantized prediction error signals.

18. The encoder of claim 16, wherein said output means comprises a variable word length encoder and zero run length encoder for comprising said quantized prediction error signals.

19. The encoder of claim 16, wherein said predictor comprises averaging means.

20. The encoder of claim 16, further comprising
means for inhibiting said output means; and
means, responsive to said quantized prediction error signals, for controlling said means for inhibiting.

21. The encoder of claim 16, further comprising means for blocking said delivering of said quantized prediction error signals for sequences of said data points, based on preselected thresholds of said quantized prediction error signals.

22. A block list decoder for decoding data, comprising:
input means for accepting quantized prediction error signals;
a data point memory for storing decoded data point signals belonging to data blocks;
a block list memory for storing a list of candidate data points in a block and storing for each candidate data point a corresponding set of prediction data point designations; where each of the designated prediction data points of a candidate data point is also a candidate data point earlier in said list;
an address counter;
means for addressing said data point memory with said address counter and said block list memory;
a predictor responsive to output signals of said data point memory
combining means responsive to said input means and to said predictor for developing said decoded data point signals and storing them in said data point memory; and
means for delivering said decoded data point signals from said data point memory in desired order.

23. The decoder of claim 22, further comprising means for accounting for missing ones of said quantized prediction error signals.

24. A method for predictively encoding scanned data signals divided into two-dimensional blocks containing a plurality of data point signals, comprising the steps of:
selecting a data point signal to be encoded in a sequence predetermined by a given ordered list;
obtaining a set of prediction data point signals for the selected data point signal from among encoded data point signals which are above, below, to the right, and to the left of the selected data point;
developing a predicted value for the selected data point signal in accordance with said set of prediction data point signals;
developing a quantized prediction error signal from a quantized arithmetic difference between the selected data point signal and said predicted value; and
developing an encoded data point signal based on said predicted value of said selected data point signal and on said quantized prediction error signal, to develop thereby said encoded data point signals.

25. A method for encoding data signals divided into blocks, where each block contains a plurality of data point signals, comprising the steps of:
employing a list that includes each of said data point signals in the role of an encoding candidate, and for each encoding candidate the list includes a set of prediction data points, where each prediction data point is found in the role of an encoding candidate earlier in the list; and
encoding each block of said data signals with a step of selecting a data point signal from said block in accordance with the encoding candidate specification of said list, a step of selecting a set of prediction data point signals associated with the encoding candidate, a step of developing a predicted value for said selected data point signal from previously encoded data point signals specified by said corresponding prediction data points in said list, and a step of developing a quantized prediction error signal from a quantized arithmetic difference between said selected data point signal and said predicted value.

* * * * *